United States Patent
Zei et al.

(10) Patent No.: US 9,558,121 B2
(45) Date of Patent: Jan. 31, 2017

(54) TWO-LEVEL CACHE LOCKING MECHANISM

(71) Applicant: INTEL CORPORATION, Santa Clara, CA (US)

(72) Inventors: Li-Gao Zei, Braunschweig (NL); Fernando Latorre, Barcelona (ES); Steffen Kosinski, Braunschweig (NL); Jaroslaw Topp, Schoeppenstedt (NL); Varun Mohandru, Braunschweig (NL); Lutz Naethke, Braunschweig (NL)

(73) Assignee: INTEL CORPORATION, Santa Clara, CA (US)

( * ) Notice: Subject to any disclaimer, the term of this patent is extended or adjusted under 35 U.S.C. 154(b) by 438 days.

(21) Appl. No.: 13/729,840

(22) Filed: Dec. 28, 2012

(65) Prior Publication Data

US 2014/0189238 A1 Jul. 3, 2014

(51) Int. Cl.
*G06F 12/00* (2006.01)
*G06F 12/08* (2016.01)
*G06F 12/10* (2016.01)

(52) U.S. Cl.
CPC ....... *G06F 12/0846* (2013.01); *G06F 12/0864* (2013.01); *G06F 12/1063* (2013.01)

(58) Field of Classification Search
CPC .................................................. G06F 12/0846
USPC ................................................ 711/128, 119
See application file for complete search history.

(56) References Cited

U.S. PATENT DOCUMENTS

| | | | | | |
|---|---|---|---|---|---|
| 4,589,092 | A | * | 5/1986 | Matick | 711/207 |
| 4,977,498 | A | * | 12/1990 | Rastegar et al. | 711/128 |
| 5,675,765 | A | * | 10/1997 | Malamy et al. | 711/146 |
| 5,860,147 | A | * | 1/1999 | Gochman et al. | 711/207 |
| 5,872,980 | A | * | 2/1999 | Derrick et al. | 710/200 |
| 5,928,352 | A | * | 7/1999 | Gochman et al. | 712/200 |
| 5,974,508 | A | * | 10/1999 | Maheshwari | 711/133 |
| 6,044,478 | A | * | 3/2000 | Green | 714/42 |
| 6,202,129 | B1 | * | 3/2001 | Palanca et al. | 711/133 |
| 6,216,200 | B1 | * | 4/2001 | Yeager | 711/100 |
| 6,430,655 | B1 | * | 8/2002 | Courtright et al. | 711/118 |
| 6,629,207 | B1 | * | 9/2003 | Yoshioka et al. | 711/125 |
| 6,643,737 | B1 | * | 11/2003 | Ono | 711/128 |

* cited by examiner

*Primary Examiner* — Yong Choe
*Assistant Examiner* — Tasnima Matin
(74) *Attorney, Agent, or Firm* — Andrews Kurth Kenyon LLP

(57) ABSTRACT

A virtually tagged cache may be configured to index virtual address entries in the cache into lockable sets based on a page offset value. When a memory operation misses on the virtually tagged cache, only the one set of virtual address entries with the same page offset may be locked. Thereafter, this general lock may be released and only an address stored in the physical tag array matching the physical address and a virtual address in the virtual tag array corresponding to the matching address stored in the physical tag array may be locked to reduce the amount and duration of locked addresses. The machine may be stalled only if a particular memory address request hits and/or tries to access one or more entries in a locked set. Devices, systems, methods, and computer readable media are provided.

21 Claims, 5 Drawing Sheets

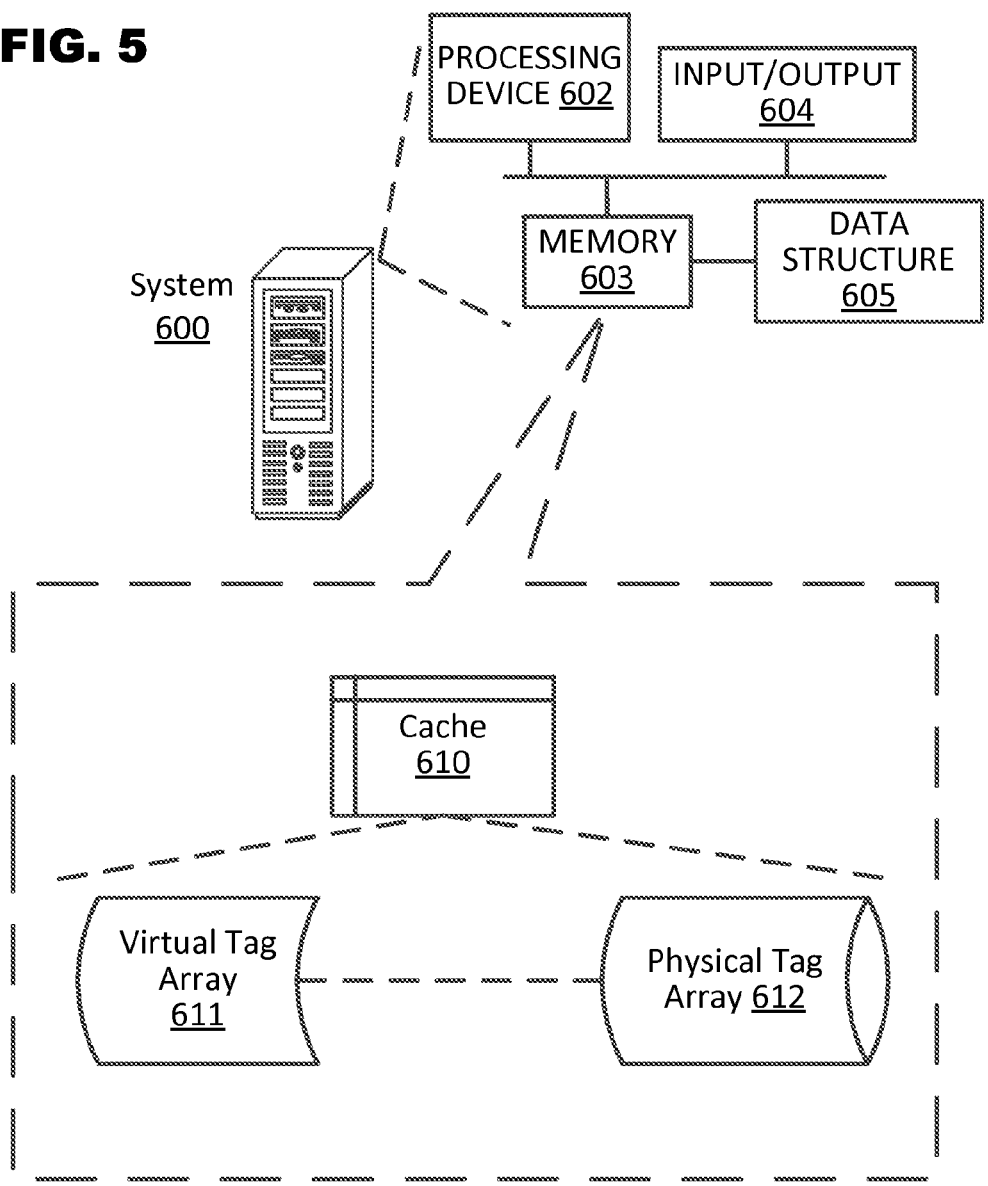

TWO-LEVEL CACHE LOCKING MECHANISM

BACKGROUND

Computer systems have used virtual memory to support multiple parallel processes and enable application code to operate independent of the physical address information stored in a cache. In these systems with virtual memory, an operating system has allocated physical memory addresses to distinct processes. Thus, some form of virtual-to-physical address translation was performed before a physically tagged cache can be accessed by an application. The translation was done dynamically by a Translation Lookaside Buffer (TLB), which contained the associated address mapping maintained by the OS. While the efficiency of higher-level caches has not been substantially impacted during translation, the translation has added latency to a first-level cache access. In the modern processors with clock frequencies in the gigahertz scale, this has resulted in one or more additional cycles to the performance critical load-to-consumer latency.

This performance degradation has been avoided by removing the translation from the critical path and applying a virtually tagged first-level cache, which uses virtual page numbers for the cache look-up instead of the physical page numbers. In these instances, the physical address was only needed to support a snoop mechanism and cache miss handling. The virtual-to-physical address translation can be done in parallel to a cache look-up and does not affect the load-to-consumer latency.

Virtual aliasing, however, has occurred when two or more virtual addresses are mapped to the same physical address. Unless virtual aliasing is checked, multiple copies of the same cache line could coexist in the cache. A write access to one of these copies will make the other copies stale and violate the correctness of the execution. Therefore, more than one modifiable copy of the same cache line must never coexist in the cache.

To prevent this situation from occurring, an operating system or other application had been configured to prevent the mapping of more than one virtual address to a same physical address. This solution, however, is computationally intensive and reduces overall performance.

A second approach involved using a virtual tag array to determine whether an address is included in the cache through a cache hit or miss, and a physical tag array outside the load-to-consumer loop for cache misses and snoop handling. Processors that have applied this second approach have stalled a machine when a memory operation misses or does not match any addresses in the virtual tag array. When the machine is stalled, the physical address was checked against the physical tag array. If there is a physical tag match, a virtually aliased entry may be evicted from and re-filled into the cache or just re-tagged with the new virtual page number. The machine then resumes its previous tasks once both virtual and physical tag entries have been updated. This second approach also adds unnecessary delay and negatively impacts overall system performance.

There is a need for preventing virtual aliasing in caches while reducing the impact on overall system performance.

BRIEF DESCRIPTION OF THE DRAWINGS

FIG. 5 shows an exemplary system architecture in an embodiment of the invention.

DETAILED DESCRIPTION

Figure 1:
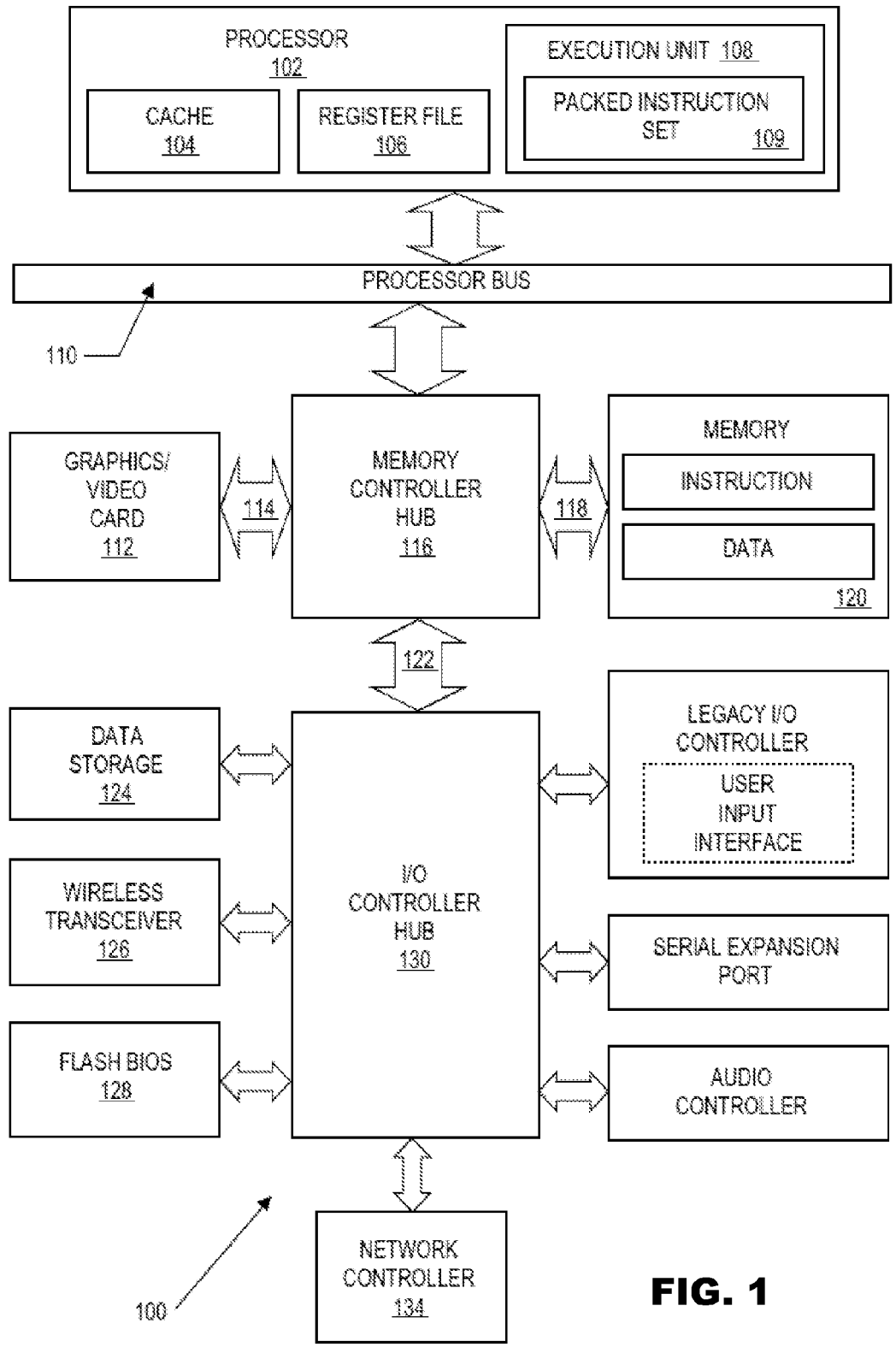
FIG. 1 shows a block diagram of a computer system in an embodiment of the invention.

In an embodiment of the invention, two virtual aliased entries may always have a same set of lower address bits associated with a page offset and a same physical page number but different virtual page numbers. A virtually tagged cache may be configured to index virtual address entries in the cache into sets based on the page offset. The sets may be structured so that all potentially virtual aliased entries are located in a same set. This way, once a memory operation misses on the virtually tagged cache, only the one set of virtual address entries with the same page offset needs to be locked. Other sets of virtual address entries need not be locked because there is no possibility of aliasing in these instances. An identifier may be added to the virtually tagged cache to identify a locking status of each set of virtual address entries. In some instances, an additional lock bit may be added to the set of address entries in the virtually tagged cache. The machine may be stalled only if a particular memory address request hits and/or tries to access one or more entries in a locked set.

In embodiments where n bits of the virtual address are used for indexing into sets, wherein the number n is greater than the number of m bits in the page offset, then the virtual aliasing protection may extends to $2(n-m)$ sets. This is because virtual addresses in each of the $2(n-m)$ sets may map to the same physical address. In this case, the addresses in each of these sets need to be protected by a same general locking bit. Depending on the different possible combinations of virtual addresses and the difference between the n indexing bits and the m page offset bits, the performance degradation that occurs during locking may be significant as additional entries are locked for longer periods.

To reduce the performance degradation and lower the number of locked entries, a second level locking mechanism, which functions as a fine grain lock bit, may be used to lock one specific entry after looking up a physical address in a physical address tag array. The general lock of the set of virtual address entries may then be released long before a potential address conflict is completely resolved. This improves performance as the number of locked entries and the locking period is minimized while also preserving data consistency.

The decision of which entry needs to be fine grain locked may be done through a victim selection process. These victim selection processes may include a LRU (Least Recently Used) or PLRU (Pseudo Least Recently Used) algorithm for the cache line replacement. Other algorithms may also be used in other embodiments. The victim selection process may be used to identify a data line to be evicted from the cache to make room for a new line to be written to the cache.

Additional procedures may be included to manage virtual aliasing during cache line replacement. When a virtual aliased entry has been detected in the cache containing the physical address tag array, the virtual aliased entry may either be re-tagged or evicted from and filled into the cache, depending on the indexing policy of the cache. This procedure may be similar to the cache line replacement process discussed above except that PLRU/LRU algorithms need not be used and no new line needs to be fetched and filled. By handling a virtual aliased entry as a victim in this manner, only one entry may need to be locked. The fine grain lock bit may prevent access of other requests to the entry while it is locked. A machine may be stalled only if a subsequent request tries to access this particular locked entry and hits on it.

In some instances, a fine grain lock bit may be implemented as a bit per line in the cache, or as a number of registers where each register specifies a pair set and/or locking status. In other embodiments, the fine grain lock bit may include more than one bit per line or lines in the cache, and need not be limited to one bit. Once the fine grain lock bit is in place, the fine grain lock bit may maintain data consistency and the general lock bit for locking one or more sets of addresses in a cone of ambiguity may be released. The fine grain lock may also be released after virtual aliasing has been resolved and the tags in both, the virtual address tagged array and physical address tagged array, have been updated.

FIG. 1 shows a block diagram of a computer system 100 formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

In an embodiment, the cache 104 may store a virtually tagged address array and a physically tagged address array. In some instances, separate caches 104 may be used to store each of these arrays, but in other instances the same cache 104 may store both arrays.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is used to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

Figure 2:
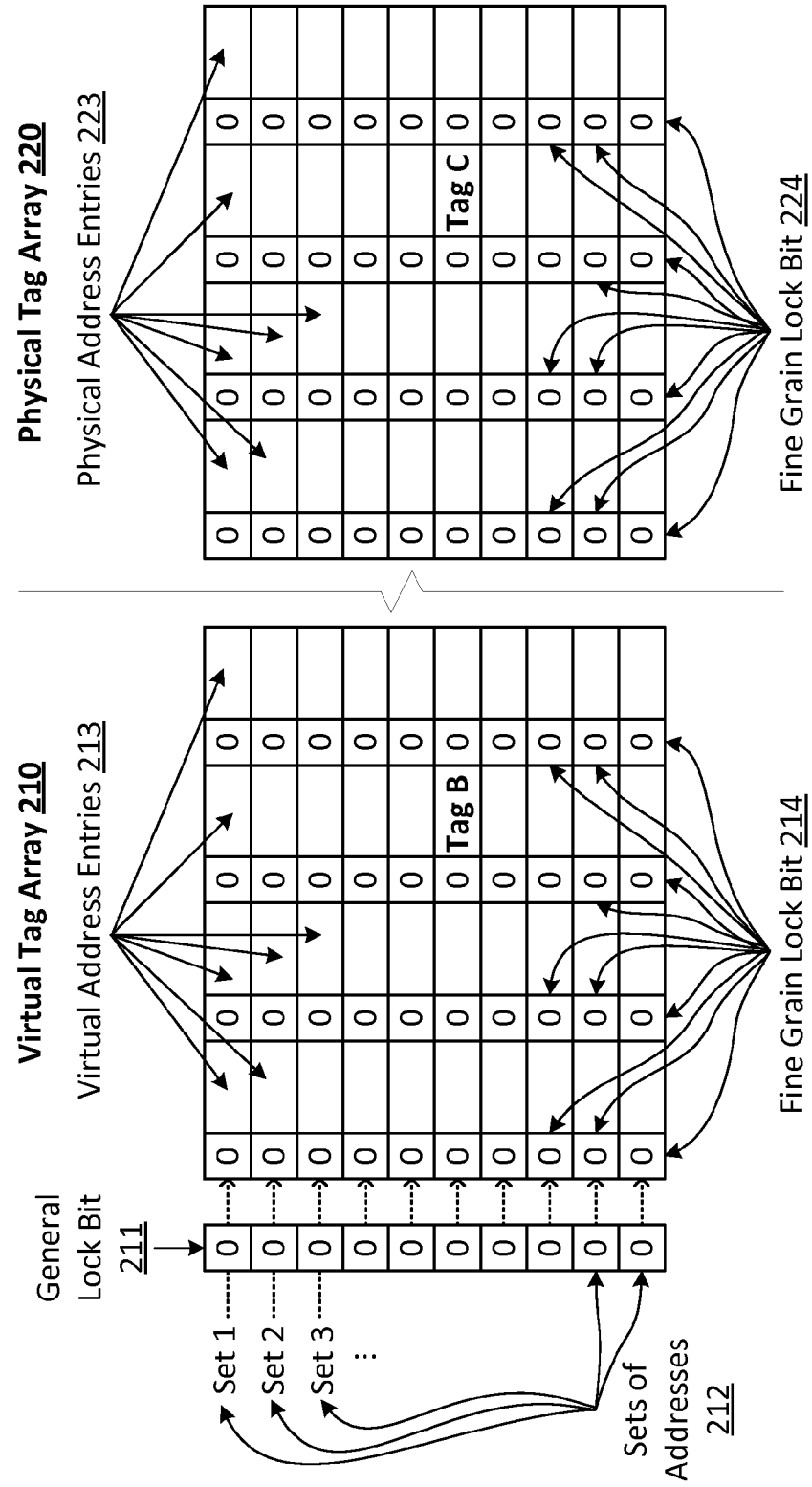
FIG. 2 shows an example of how virtual and physical tag arrays in a cache may be configured in an embodiment of the invention.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip FIG. 2 shows an example of how a virtually tagged array 210 and a physical tag address array 220 may be configured in an embodiment of the invention. The virtual tag array 210 may store different virtual address entries 213. Each of these address entries may be grouped into a set 212 with other address entries having a same page offset corresponding to the lower address bits of the address entry. Thus, set 1, shown in the first row of virtual array 210 may include those virtual address entries having lower address bit values associated with set 1. Set 2, shown in the second row of virtual array 210 may include those entries with lower address bit values associated with set 2, and so on.

Each of the virtual address entries 213 may also have an additional fine grain lock bit 214 associated with the respective entry 213. The fine grain lock bit 214 may indicate whether the particular address entry 213 is locked or not. Each set of addresses 212 may also have an additional general lock bit 211 associated with the respective address set 212. The general lock bit 211 may indicate whether the each of the address entries 213 in the respective set 212 is locked or not.

In the example shown in FIG. 2, a read request to virtual address A which is associated with physical address C may be followed by a write request to virtual address B which may also be associated with the same physical address C. Respective entries 213 and 223 in virtual and physical arrays 210 and 230 may store respective tags for addresses B and C, but not address A.

In this example, the read request to address A may not match any of the entries in the virtual tag array 210 resulting in a miss. As a result, the general lock bit 211 for the set containing the same page offset as address A may be set to lock the set. As discussed previously, each of the entries 213 in the array 210 may be grouped together that have a same page offset or lower address bit values. In this example, the row in the array 210 containing the Tag B entry 213 may correspond to the same page offset as address A. The general lock bit 211 for this row may then be set to a "1" or other value to indicate that the entries 213 in the row are locked.

Thereafter, the corresponding entries 223 in the physical tag array 220 may be checked to determine whether the physical address C, that virtual address A maps to, is associated with another virtual address. In this case, the Tag C entry 223 in physical tag array 220 indicates that the physical address C may be associated with another virtual address and may be subject to virtual aliasing. The fine grain lock bit 224 of the Tag C entry in the physical tag array 220 may then be set to a "1" or other value to indicate that the Tag C entry is now locked for further resolution of possible virtual aliasing. The corresponding fine grain lock bit 214 in virtual tag array 210, which in this example is the Tag B entry in virtual tag array 210, may then be set to a "1" or other value to indicate that the Tag B entry is now locked for further resolution of possible virtual aliasing. The general lock bit 211 for the set of entries associated with the Tag B entry may then be set to a "0" or other value to indicate that the other entries in the set are now unlocked.

Figure 3:
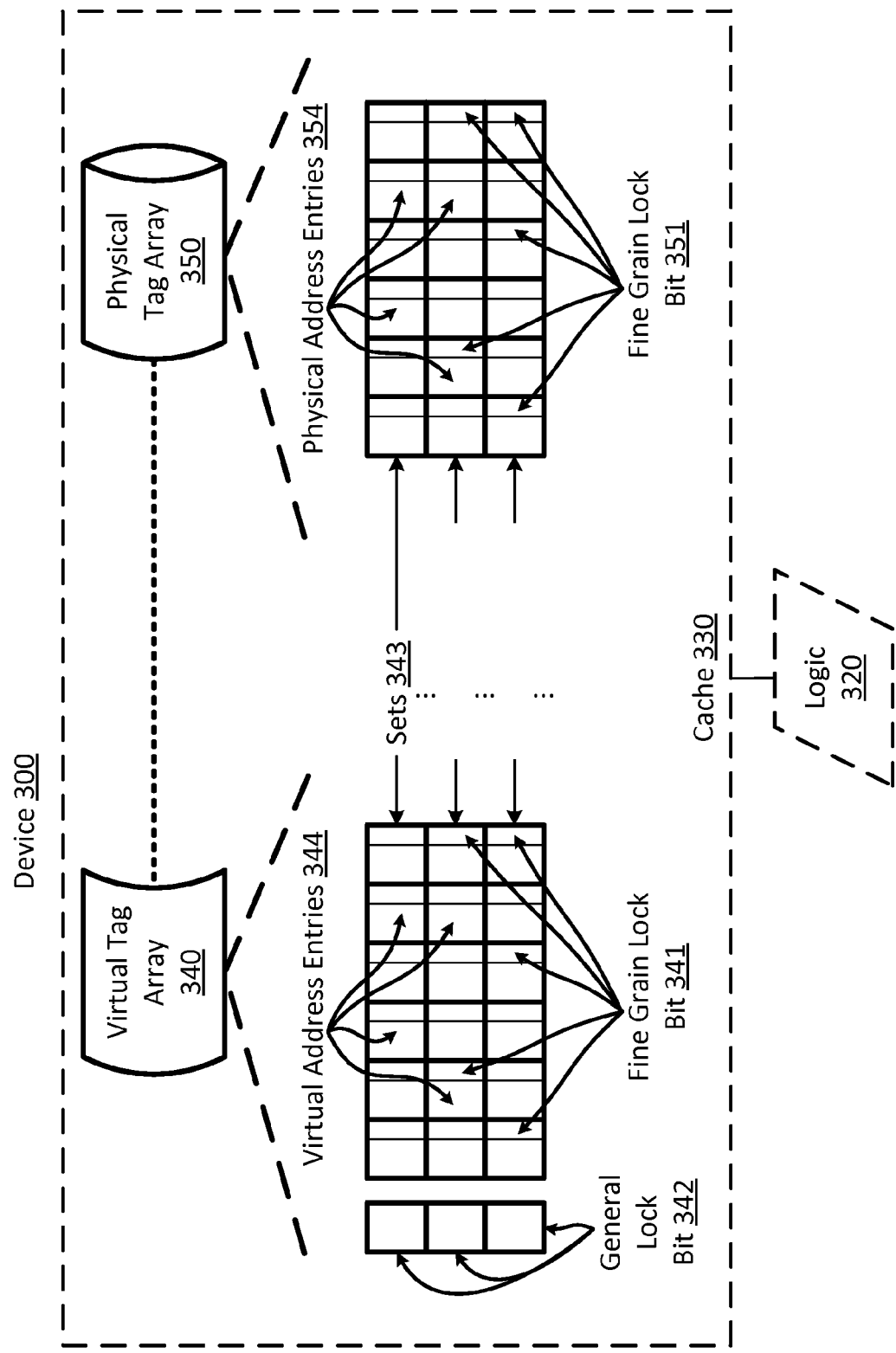
FIG. 3 shows an exemplary device in an embodiment of the invention.

FIG. 3 shows an exemplary embodiment of a device 300 in an embodiment of the invention. A device 300, such as a memory device, may include one or more caches 330. Some of the caches 330 may include a virtual tag array 340 and a physical tag array 350. The device 300 may also include logic 320.

The virtual tag array 340 may include virtual address entries 344 grouped into sets 343 based on a page offset value of each virtual address entry 344. The virtual tag array 340 may also include a general lock bit 342 for each of the sets 343 indicating whether each of the virtual address entries 344 in a respective set are locked. The virtual tag array 340 may also include a first fine grain lock bit 341 for each virtual address entry 344 indicating whether the entry 344 is locked.

The physical tag array 350 may include physical address entries 354 corresponding to the virtual address entries 344 in the virtual tag array 340. The physical tag array may also include a second fine grain lock bit 351 for each physical address entry 354.

The one or more caches 330 may store the virtual tag array 340 and the physical tag array 350.

The logic 320 may be configured to compare a virtual address associated with a memory access request to the virtual address entries 344 and set the general lock bit 342 to a locked state for a set of virtual address entries 343 having a similar page offset as the virtual address when the virtual address does not match any of the virtual address entries 344 stored in the virtual tag array 340. The page offset value may be a value of one or more predetermined lower address bits of one or more memory addresses. The virtual address entries may be indexed based on their page offset values to identify each of the sets.

The logic 320 may also be configured to compare a physical address associated with the virtual address to the physical address entries 354. The first and the second fine grain lock bits 341 and 351 may then be set to the locked state for address entries 354 and 344 in the physical and virtual tag arrays 350 and 340 corresponding to the physical address. The general lock bit 342 that was previously set to the locked state by the logic 320 may be changed to an unlocked state.

Figure 4:
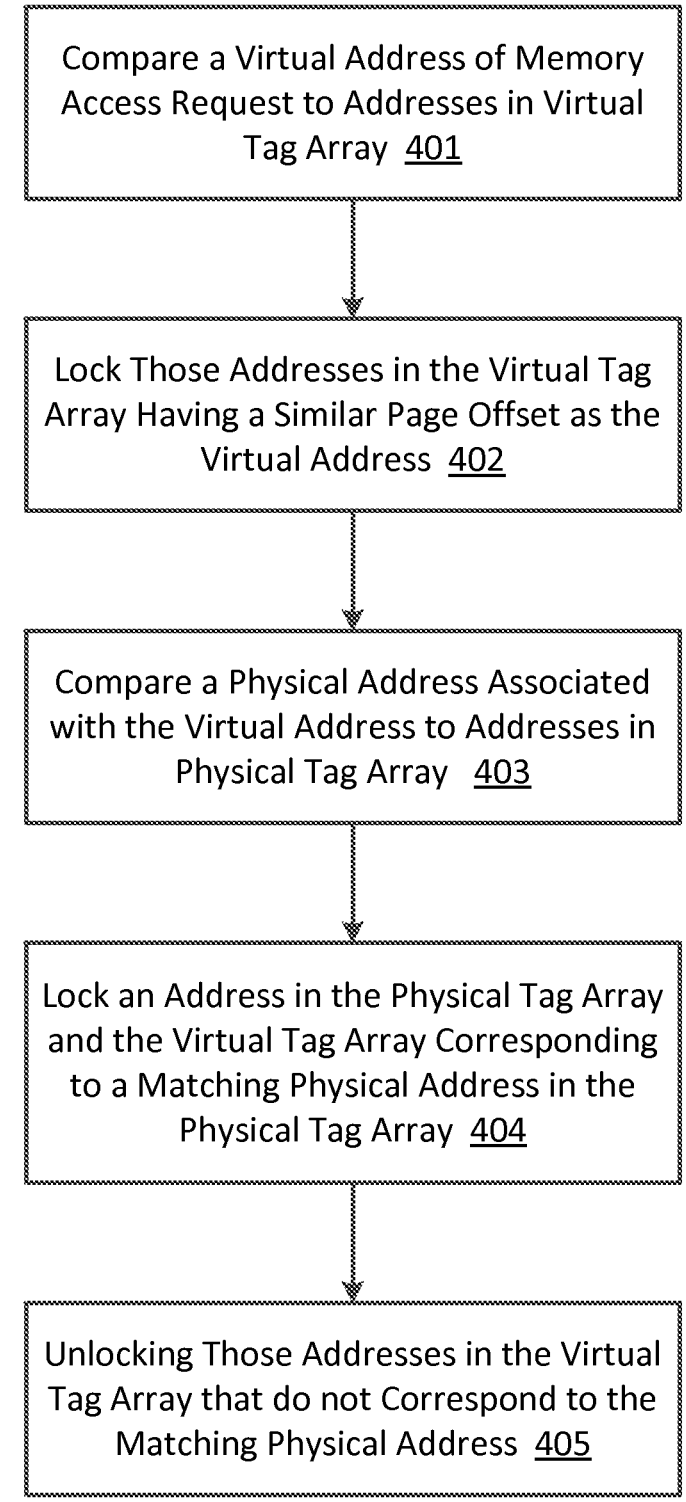
FIG. 4 shows an exemplary process in an embodiment of the invention.

FIG. 4 shows an exemplary process in an embodiment of the invention. Each of the processes described in FIG. 4 and elsewhere may be included as instructions on a computer readable medium, such as memory, hard drive, solid state drive, compact disc, digital video disc, flash memory, random access memory (RAM), or other types of media that are readable by a computer or processing device. These instructions may, when executed by a processing device, cause the processing device to perform a process associated with the instructions.

In box 401, a virtual address associated with a memory access request may be compared to addresses stored in a virtual tag array of a first cache.

In box 402, those addresses in the virtual tag array having a similar page offset as the virtual address may be locked when the virtual address does not match any of the addresses stored in the virtual tag array.

In box 403, a physical address associated with the virtual address may be compared to addresses stored in a physical tag array of a second cache. In some instances, the first cache and the second cache may be part of a same, single cache but in other instances the caches may be different caches.

In box 404, an address stored in the physical tag array matching the physical address and a virtual address in the virtual tag array corresponding to the matching address stored in the physical tag array may be locked.

In box 405, those addresses in the virtual tag array previously locked in box 402, that do not correspond to the matching physical address, may be unlocked.

In some instances, a general lock bit associated with those addresses in the virtual tag array having a similar page offset as the virtual address may be set to a first value to lock those addresses. A fine grain lock bit associated with each address stored in the physical tag array matching the physical address and each virtual address in the virtual tag array corresponding to the matching address stored in the physical tag array may be set to a second value to lock those addresses. The first and second values may be a same value or they may be different values. The general lock bit may be set to a third value, which may be different from the first value, to unlock those addresses in the virtual tag array that do not correspond to the matching address.

In some instances, the address stored in the physical tag array matching the physical address and the virtual address in the virtual tag array corresponding to the matching address stored in the physical tag array may be locked until a virtually aliased address entry is resolved. In some instance, the virtually aliased address entry may be resolved by evicting the virtually aliased entry from a cache. In other instances, the virtually aliased address entry may be resolved by retagging the virtually aliased entry.

In some instances, a machine, such as a processor or other processing device, may be stalled when processing a request directed to a locked address until a virtual aliasing resolution procedure is complete. The virtual address may be accessed when the virtual address matches an address stored in the virtual tag array.

FIG. 5 shows an exemplary architecture of a system 600 in an embodiment of the invention. System 600 may include a cache 610, a virtual tag array 611, and a physical tag array 612, all of which may be part of memory 603.

The virtual tag array 611 may include two or more virtual address entries of allocated virtual memory addresses. The physical tag array 612 may include a plurality of physical address entries of allocated physical memory addresses. The cache 610 may store the virtual tag array 611 and the physical tag array 612.

System 600 may also include a processing device 602. The processing device 602 may be configured to compare a virtual address associated with a memory access request to addresses stored in the virtual tag array 611. The processing device 602 may be configured to lock those addresses in the virtual tag array 611 having a similar page offset as the virtual address when the virtual address does not match any of the addresses stored in the virtual tag array 611.

The processing device 602 may also be configured to compare a physical address associated with the virtual address to addresses stored in the physical tag array 612. The processing device 602 may also be configured to lock an address stored in the physical tag array 612 matching the physical address and a virtual address in the virtual tag array 611 corresponding to the matching address stored in the physical tag array 612 while unlocking those addresses in the virtual tag array 611 that do not correspond to the matching physical address.

The virtual address entries in the virtual tag array 611 may be grouped in sets having similar page offset values. Each set of virtual address entries may have a general lock bit associated with the set indicating whether the entries in the respective set are locked. Each virtual address entry may have an associated fine grain lock bit indicating whether the respective virtual address entry is locked.

System 600 may also contain a communications device 604. The processing device 602, memory 603 storing loaded data or a loaded data structure 605, and communications device 604 may be interconnected via a system bus. In various embodiments, system 600 may have an architecture with modular hardware and/or software systems that include additional and/or different systems communicating through one or more networks.

Communications device 604 may enable connectivity between the processing devices 602 in system 600 and that of other systems (not shown) by encoding data to be sent from the processing device 602 to another system and decoding data received from another system for the processing device 602.

In an embodiment, memory 603 may contain different components for retrieving, presenting, changing, and saving data. Memory 603 may include a variety of memory devices, for example, Dynamic Random Access Memory (DRAM), Static RAM (SRAM), flash memory, cache memory, and other memory devices. Additionally, for example, memory 603 and processing device(s) 602 may be distributed across several different computers that collectively comprise a system.

Processing device 602 may perform computation and control functions of a system and may include a suitable central processing unit (CPU). Processing device 602 may include a single integrated circuit, such as a microprocessing device, or may include any suitable number of integrated circuit devices and/or circuit boards working in cooperation to accomplish the functions of a processing device. Processing device 602 may execute computer programs, such as object-oriented computer programs, within memory 603.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, the virtual tag array 611 and physical tag array 612 in FIG. 5 are shown as being included in a single cache 610, but in other embodiments the virtual tag array 611 and the physical tag array 612 may be stored in different caches.

We claim:

1. A memory device comprising:
   a virtual tag array including:
      a plurality of virtual address entries grouped into sets wherein each of the virtual address entries for each set has a same page offset value,
      a general lock bit for each of the sets indicating whether each of the virtual address entries in a respective set are locked, and
      a first fine grain lock bit for each virtual address entry indicating whether the entry is locked;
   a physical tag array including a plurality of physical address entries corresponding to virtual address entries and a second fine grain lock bit for each physical address entry; and
   a cache storing the virtual tag array and the physical tag array.

2. The memory device of claim 1, further comprising logic to compare a virtual address associated with a memory access request to the virtual address entries and set the general lock bit to a locked state for a set of virtual address entries having a similar page offset as the virtual address when the virtual address does not match any of the virtual address entries stored in the virtual tag array.

3. The memory device of claim 2, wherein the logic is configured to: (i) compare a physical address associated with the virtual address to the physical address entries, (ii) set the first and the second fine grain lock bits to the locked state for address entries in the physical and virtual tag arrays corresponding to the physical address, and (iii) set the locked state general lock bit to an unlocked state.

4. The memory device of claim 2, wherein the page offset value is a value of predetermined lower address bits of a memory address.

5. The memory device of claim 1, wherein the virtual address entries are indexed based on their page offset values to identify each of the sets.

6. A method comprising:
   comparing a virtual address associated with a memory access request to addresses stored in a virtual tag array of a first cache, wherein addresses stored in the virtual tag array are grouped into sets and each of the virtual address entries for each set has a same page offset value;

locking, using a general lock bit and a fine grain bit, those addresses in the virtual tag array having a similar page offset as the virtual address when the virtual address does not match any of the addresses stored in the virtual tag array;

comparing a physical address associated with the virtual address to addresses stored in a physical tag array of a second cache; and locking, using a second fine grain bit, an address stored in the physical tag array matching the physical address and a virtual address in the virtual tag array corresponding to the matching address stored in the physical tag array while unlocking those addresses in the virtual tag array that do not correspond to the matching physical address.

7. The method of claim 6, further comprising, setting the general lock bit associated with those addresses in the virtual tag array having a similar page offset as the virtual address to a first value to lock those addresses.

8. The method of claim 7, further comprising, setting the second fine grain lock bit associated with each address stored in the physical tag array matching the physical address and each virtual address in the virtual tag array corresponding to the matching address stored in the physical tag array to a second value to lock those addresses.

9. The method of claim 8, further comprising, setting the general lock bit to a third value to unlock those addresses in the virtual tag array that do not correspond to the matching address.

10. The method of claim 6, further comprising accessing the virtual address when the virtual address matches an address stored in the virtual tag array.

11. The method of claim 6, further comprising locking the address stored in the physical tag array matching the physical address and the virtual address in the virtual tag array corresponding to the matching address stored in the physical tag array until a virtually aliased entry is resolved.

12. The method of claim 11, further comprising evicting the virtually aliased entry from a cache to resolve the virtually aliased entry.

13. The method of claim 11, further comprising retagging the virtually aliased entry to resolve the virtually aliased entry.

14. The method of claim 6, further comprising, stalling a machine when processing a request directed to a locked address until a virtual aliasing resolution procedure is complete.

15. The method of claim 6, wherein the first cache and the second cache are a same cache.

16. The method of claim 6, wherein the first cache and the second cache are different caches.

17. A non-transitory computer readable medium storing instructions that, when executed by a processing device, cause the processing device to:

compare a virtual address associated with a memory access request to addresses stored in a virtual tag array of a first cache, wherein addresses stored in the virtual tag array are grouped into sets and each of the virtual address entries for each set has a same page offset value;

lock, using a general lock bit and a fine grain bit, those addresses in the virtual tag array having a similar page offset as the virtual address when the virtual address does not match any of the addresses stored in the virtual tag array;

compare a physical address associated with the virtual address to addresses stored in a physical tag array of a second cache; and lock, using a second fine grain bit, an address stored in the physical tag array matching the physical address and a virtual address in the virtual tag array corresponding to the matching address stored in the physical tag array while unlocking those addresses in the virtual tag array that do not correspond to the matching physical address.

18. The non-transitory computer readable medium of claim 17, further comprising additional instructions that, when executed by the processing device, cause the processing device to:

set the general lock bit associated with those addresses in the virtual tag array having a similar page offset as the virtual address to a first value to lock those addresses;

set a fine grain lock bit associated with each address stored in the physical tag array matching the physical address and each virtual address in the virtual tag array corresponding to the matching address stored in the physical tag array to a second value to lock those addresses; and set the general lock bit to a third value to unlock those addresses in the virtual tag array that do not correspond to the matching physical address.

19. The non-transitory computer readable medium of claim 18, wherein the first value and the second value are a same value.

20. A system comprising:

a virtual tag array including a plurality of virtual address entries;

a physical tag array including a plurality of physical address entries;

a cache storing the virtual tag array and the physical tag array; and a processing device configured to:

compare a virtual address associated with a memory access request to addresses stored in the virtual tag array, wherein addresses stored in the virtual tag array are grouped into sets and each of the virtual address entries for each set has a same page offset value, lock, using a general lock bit and a fine grain bit, those addresses in the virtual tag array having a similar page offset as the virtual address when the virtual address does not match any of the addresses stored in the virtual tag array, compare a physical address associated with the virtual address to addresses stored in the physical tag array, and lock, using a second fine grain bit, an address stored in the physical tag array matching the physical address and a virtual address in the virtual tag array corresponding to the matching address stored in the physical tag array while unlocking those addresses in the virtual tag array that do not correspond to the matching physical address.

21. The system of claim 20, wherein the virtual address entries in the virtual tag array are grouped in sets having similar page offset values, each set of virtual address entries has a general lock bit associated with the set indicating whether the entries in the respective set are locked, and each virtual address entry has an associated fine grain lock bit indicating whether the respective virtual address entry is locked.

* * * * *